United States Patent [19]

Anderson

[11] Patent Number: 4,594,941
[45] Date of Patent: Jun. 17, 1986

[54] FOOD COOKING MACHINE WITH CONTROL MECHANISM

[76] Inventor: Edward M. Anderson, 2620 E. Medicine Lake Blvd., Minneapolis, Minn. 55441

[21] Appl. No.: 612,579

[22] Filed: May 21, 1984

[51] Int. Cl.⁴ .............................................. A47J 37/12
[52] U.S. Cl. ...................................... 99/334; 99/406; 99/407; 99/409; 426/233
[58] Field of Search ................. 99/403, 404, 405, 406, 99/407, 409, 334; 426/233, 496, 497

[56] References Cited

U.S. PATENT DOCUMENTS 2,110,748  3/1938  Tweedale .............................. 99/334
4,082,033  4/1978  Fester ..................................... 99/409

FOREIGN PATENT DOCUMENTS 2213813  10/1973  Fed. Rep. of Germany ........ 99/334
2408283  9/1975  Fed. Rep. of Germany ........ 99/409

Primary Examiner—Billy J. Wilhite
Attorney, Agent, or Firm—Henry C. Kovar

[57] ABSTRACT

A multiple mode deep fat food frying machine has a deep fat cooker, a hopper with structure for dropping food into the deep fat, and a multiple mode control for the food dropping structure; the control has a rotary cam with inner apertures and an outer periphery with a detent having a root at a greater radius than the aperture, a first photo-optical sensor picks up the apertures and a second photo optical sensor picks up the detent, a selector sends the signals from only one or the other sensor to the food dropping structure, the cam is mounted on a drive for a device to remove food from the fat. A method of controlling a fat fryer has the steps of rotating a cam, optically sensing the apertures, optically sensing the detent, and direction one of the sensing to control food drop; this apparatus and method are paticularily suited for a hot and greasy environment.

21 Claims, 4 Drawing Figures

4,594,941

FOOD COOKING MACHINE WITH CONTROL MECHANISM

BACKGROUND OF THE INVENTION

1. Field of the Invention

This invention pertains to a multiple mode food frying machine, to a control for a food frying machine.

2. The Prior Art

Deep fat food fryers have always had trouble with their controls. The fryers are extremely hot, they spit cooking oil, they emit cooking oil vapors that condense on the controls, the oil on the control gathers dust and then oxidizes into a gummy film that sticks up switches and other control components. Small mechanical switches have been a continual problem. Grease deposits get in the points and operation becomes eratic. If the points start arcing, there's a danger of igniting the fumes from hot cooking oil. The plastic housings of small mechanical switches become brittle and crack under the heat of deep fat food cookers.

When all this is considered, there is considerable improvement that needs to be done to the controls of deep fat food cookers.

Of particular interest are commercial cookers which are relied upon to produce revenues for incomes. These machines are expected to be very reliable and to require low maintenance.

OBJECTS OF THE INVENTION

It is an object of the present invention to provide a multiple mode food cooking machine having an improved control.

It is an object of the present invention to provide an improved food cooking machine control having a cam with multiple control contours.

It is an object of the present invention to provide a food cooking machine having a photo-optic control.

It is an object of the present inventon to provide a cooking machine having a control cam on a drive mechanism, and a cam sensor that does not touch the cam.

These and other objects of the present invention will become manifest to those versed in the art upon study of the teachings herein.

SUMMARY OF THE INVENTION

According to the principles of the present invention, a food frying machine has a cooker, structure for manipulating food in the cooker, and a multiple mode control for the structure; the control has a cam with first and second control contours, a first sensor to sense the first contour, a second sensor to sense a second contour, and a selector connected between the manipulating structure and the two sensors for selection of a first or second mode of operation of the manipulating structure.

A food frying machine control having multiple modes has a rotary cam with first and second control contours, first and second sensors to sense the first and second contours respectively, and a selector connected to both sensors for selectors of a first or second control mode of the frying machine.

A deep fat frying machine has structure for manipulating food in the machine, a manipulating structure control having a cam with a control contour and a sensor which senses the contour without contacting the cam, and a motor and drive connected to the manipulating structure, the cam being mounted on the drive.

AS SHOWN ON THE DRAWINGS

Figure 1:
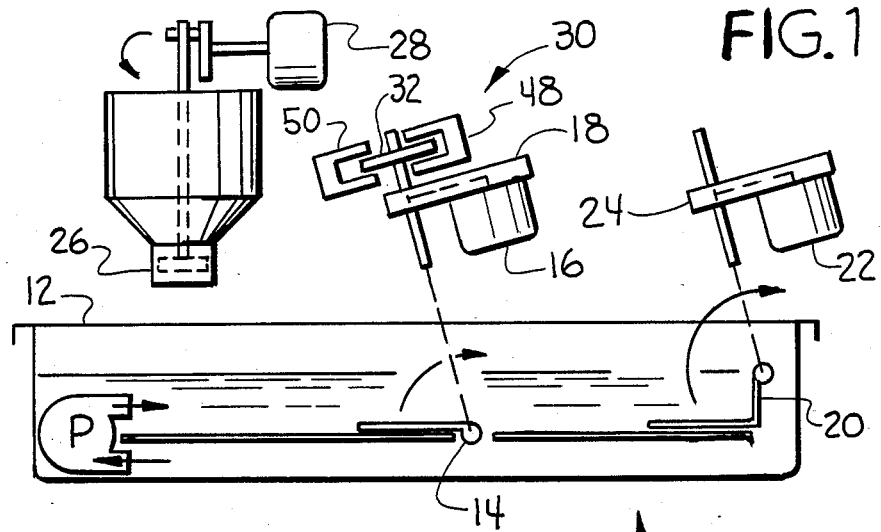
FIG. 1 is a schematic elevational view of a cooking machine according to the present invention.
Figure 2:
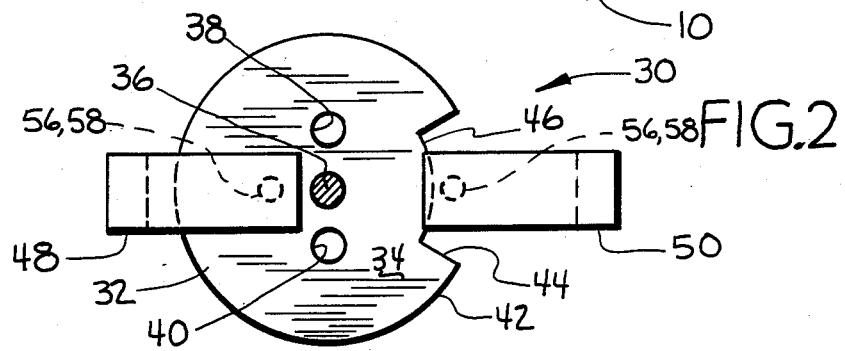
FIG. 2 is an elevational detail view of the control of the present invention, as embodied in the machine of FIG. 1.
Figure 3:
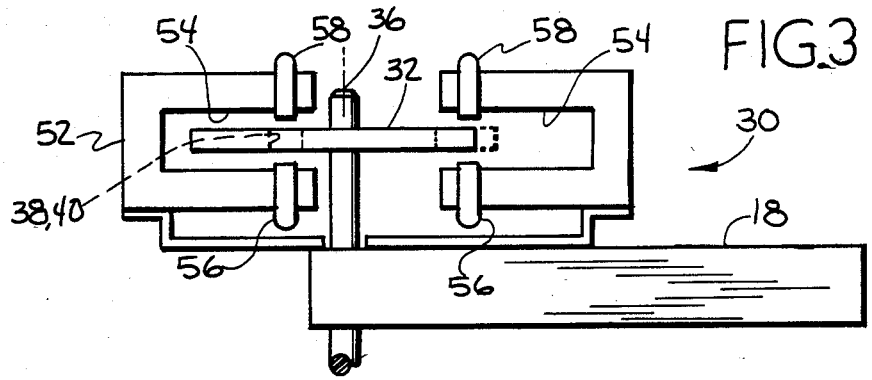
FIG. 3 is a top plan view of the structure of FIG. 2.
Figure 4:
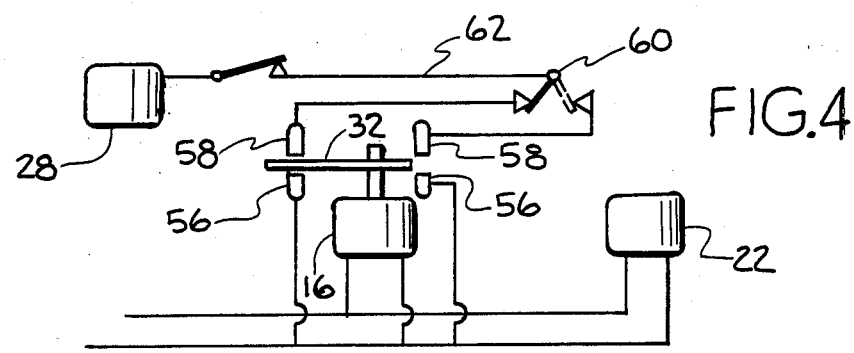
FIG. 4 is an electrical schematic of the machine of FIG. 1.

The principles of the present invention are particularly useful when embodied in a food cooking machine, such as schematically shown in FIG. 1 and generally indicated by the numeral 10.

The machine 10 has deep fat cooker 12 within which there is a food turner 14, sometimes called a flipper, which is driven by a motor 16 and a gearbox drive 18. The cooker 12 also has a food remover 20 which is driven by a motor 22 and gearbox drive 24. The machine 10 has a food dropper 26 which is driven by a separate motor 28. The dropper 26 is preferrably a hopper for dough and drops dough in the shape of a donut each time it is cycled.

An important feature of this invention is a cooking machine control generally indicated by the numeral 30 which provides multiple mode control for the cooking machine 10 and which is explosion proof, arc-less, and which does not utilize mechanical followers or switches.

The control 30 has a rotary cam 32 mounted upon and co-rotatable with the drive 18 for the food turner 14; the cam 32 could alternatively be mounted upon and be co-rotatable with the food remover drive 24. The cam 32 has an opaque integral single piece disc 34 rotatable about an axis 36. The cam 32 has an aperture 38 which forms a first control contour; a second and like aperture 40 also forms a portion of a first control contour. The apertures 38, 40 are preferably located inward toward the axis 36 from a periphery 42 of the cam disc 34. The periphery 42 has a detent 44 with a root 46. The root 46 has a radius which places the root 46 further from the axis 36 than the outermost part of either aperture 38, 40. The periphery 44, with the detent 44 and root 46, form a second control contour.

A first sensor 48 and a second sensor 50 are mounted on the machine 10 to sense the first control contour 38, 40 and second control contour 42, 44, 46 respectively. The sensors 48, 50 are mounted adjacent to but do not touch the cam 32. The sensors 48, 50 are structurally identical to each other, and each has a C-shaped frame 52 with a slot 54 within which the cam 32 rotates. One leg of the frame 52 has an infra-red emitter 56 and the other leg of the frame 52 has an infra-red receiver 58. The emitter 56 and receiver 58 face each other and the cam disc 34 and optical communication between them is normally obstructed by the opaque cam disc 34. Each receiver 58 is connected to a singe pole double throw selector 60 having a single output 62 connected to control cycling of the dropper motor 28. The output 62 can alternatively be connected to control the cycling of the remover motor 22. If the control 30 is driven by the remover motor 22, the output 62 can be connected to control the turner motor 16.

In the cam 32, the aperture 38, 40 are spaced 180 degrees from each other. The detent 46 is radially positioned in between the aperture 38, 40. The first sensor 48 is positioned relatively close to the axis 36 so that it senses only the aperture 38, 40. The second sensor 50 is positioned relatively far from the axis 36 so that it senses only the detent 44. As the cam 32 revolves, the first sensor 48 gives two pulses and the second sensor 50 gives one pulse. It will be appreciated that the quantities of apertures and detent can be reversed, specifically one aperture and two detents for example. Regardless, the aperture 38 and detent 44 are at different radii from the cam axis 36 so that only the respective sensor 48, 50 will sense the appropriate control contour. The sensors 48, 50 are mounted on opposite sides of the cam and the second sensor 50 signal will always be in phase with one of the signals of the first sensor 48.

In operation of the machine 10 and control 30, and in the practice of the method of the present invention, the cooker 12 is loaded with oil and is heated to about 400 degrees F. The food dropper 26 is loaded with dough or whatever food product it accommodates and the turner motor 16 and remover motor 22 are energized and operated. The selector 60 is placed in either the first mode or the second mode as is desired. The cam 32 is continuously rotated by whichever drive 18, 24 it is mounted upon. When the selector 60 is in the first mode, the first sensor 48 gives out two equa-spaced signals per each revolution of the cam 32. At each signal the food dropper 26 will drop one quantity of food into the cooker 12. When the selector 60 is placed in the second mode, the second sensor 50 will give only one pulse per revolution of the cam 32. This is called a "skip" cycle and effects a situation wherein the food machine makes only half as much cooked food, and effectively doubles the time taken to cook a given quantity of food. The control surfaces 38, 40, 44 are sensed one inside of the other so that the sensors 48, 50 are not confused. The control contours 38, 40, 44 are optically sensed completely eliminating problems with grease build up and failure of switch follows. The sensing of the first and second control contours 38, 40, 44 is done simultaneously ad without friction. The sensing controls the dropping or filling function of the machine 10.

The apparatus and method of this invention are particularly useful in commercial deep fat fry machines, and in particular in donut machines used at fairs, circuses, carnivals and the like. The first mode of operation provides maximum production and the second mode provides half-rate production when the crowd is decreased. The second mode keeps the machine 10 operating when only a small crowd is present so that the enticing cooking aromas and fascinating operation of the machine 10 keep customers coming, looking and buying.

The optical control 30 has significantly higher reliability than the mechanical predecessors and is explosion proof, fail safe, eliminates an electrical hazard, and is indifferent to grease and oil vapors.

Although other advantages may be found and realized, and various and minor modifications suggested by those varied in the art, be it understood that I wish to embody within the scope of the patent warranted hereon, all such embodiments as reasonably and properly come within the scope of my contribution to the art.

I claim as my invention:

1. A multiple mode food frying machine having;
   a. a deep fat cooker;
   b. means associated with said cooker for manipulating food in the cooker;
   c. a multiple mode control for said manipulating means, said control having;
      (1) a cam with first and second control contours,
      (2) a first sensor mounted to sense the first control contour and to control the manipulating means therefrom in a first mode.
      (3) a second sensor mounted to sense the second control contour and to control the manipulating means therefrom in a second mode, and
      (4) a selector connected firstly in between said manipulating means and the first sensor, and in between the manipulating means and the second sensor for selection of one of operating modes offered by the control.

2. A food frying machine according to claim 1, in which said food manipulating means comprises means for dropping food into the deep fat cooker.

3. A food frying machine according to claim 2, in which said second sensor and said second control contour effect a mode in which the food dropping means skips cycles.

4. A food frying machine according to claim 1, including
   means associated with said cooker for removing food therefrom;
   a drive structure connected to and for said removing means; and in which
   said cam is mounted on said drive structure.

5. A food frying machine according to claim 1, in which said sensors are photo optical.

6. A food frying machine according to claim 1, in which said sensors are on opposite sides of the cam.

7. A food frying machine according to claim 5, in which said cam is rotary, and said sensors are each in a C-shape with an emitter and a receiver both facing toward a disc of the cam.

8. A food frying machine according to claim 5 in which the cam has an axis of rotation in which the first sensor is closer to the axis than the second sensor, said sensors being otherwise essentially identical.

9. A food frying machine according to claim 5, in which the cam normally precludes optional transmission between an emitter and a receiver.

10. A food frying machine according to claim 9, in which the first control contour comprises at least one aperture in a cam disc.

11. A food frying machine according to claim 10, in which the second control contour is a detent in the outer diameter of a rotary said cam, said detent having a root at a greater distance from a cam axis than the first control contour.

12. A food frying maching according to claim 11, in which the first control contour includes an opposed pair of said apertures, the detent being spaced radially from either aperture.

13. A food frying machine control having multiple modes and being reliably operative in an atmosphere of hot fat, high temperature and heat comprising:
   (a) a rotary cam having a first and interior control contour, a second and exterior control contour, and means for connection of the cam to a source of rotating motion;
   (b) a first electronic sensor mounted to sense the first control contour;
   (c) a second electronic sensor mounted to sense the second control contour; and (d) a selector connected to both of the sensors for selectively connecting only one of the sensors to an output for control of a function of the food frying machine.

14. A food frying machine control according to claim 13, in which the cam comprises a disc within the exterior control contour, and in which the first control contour is at least one aperture within the disc.

15. A food frying machine control according to claim 14, wherein the second control contour is a detent in the periphery of the cam.

16. A food frying machine control according to claim 15, including a second such aperture spaced radially 180 degrees from the first said aperture.

17. A food frying machine control according to claim 16, in which the detent is in between the apertures.

18. A food frying machine control according to claim 17, in which the sensors are on opposite sides of the cam.

19. A food frying machine control according to claim 13, in which the sensors are photo-optical.

20. A food frying machine control according to claim 19, in which each sensor has a C-shaped frame within which the cam is rotatable, and an emitter and a receiver both of which directly face against a disc of the cam, said cam normally precluding transmission from the emitter to the receiver.

21. A deep fat food frying machine having:
   (a) means for manipulating food in the machine;
   (b) a control for the manipulating means, said control having:
      (1) a cam with a control contour thereon,
      (2) a contour sensor which is spaced from the cam and which has means for sensing the contour without contacting the cam; and
   (c) a motor and drive connected to means for moving food in the machine, said cam being mounted upon said drive and being co-movable therewith so that the cam is sycronized to the food moving means.

* * * * *